United States Patent [19]

Hartness

[11] Patent Number: 4,567,978
[45] Date of Patent: Feb. 4, 1986

[54] ARTICLE UNSCRAMBLER

[76] Inventor: Thomas S. Hartness, Rte. 12, Paris Mountain, Greenville, S.C. 29609

[21] Appl. No.: 541,461

[22] Filed: Oct. 13, 1983

[51] Int. Cl.$^4$ .............................................. B65G 47/00
[52] U.S. Cl. ..................................... 198/454; 198/457
[58] Field of Search .............. 198/453, 454, 455, 457, 198/597, 599, 637, 836

[56] References Cited

U.S. PATENT DOCUMENTS

| | | | |
|---|---|---|---|
| 2,047,106 | 7/1936 | Lidberg et al. | 198/455 |
| 2,373,600 | 4/1945 | Richey | 198/454 |
| 2,541,300 | 2/1951 | Silva | 198/455 |
| 3,465,868 | 9/1969 | Donner | 198/454 |
| 3,610,396 | 10/1971 | Babunovic | 198/454 |
| 3,707,216 | 12/1972 | Peres | 198/455 |
| 3,862,680 | 1/1975 | Johnson | 198/454 |
| 4,236,625 | 12/1980 | Smith et al. | 198/454 |

FOREIGN PATENT DOCUMENTS 2411317  10/1974  Fed. Rep. of Germany ...... 198/455

Primary Examiner—Joseph E. Valenza
Assistant Examiner—Daniel R. Alexander
Attorney, Agent, or Firm—Dority & Manning

[57] ABSTRACT

An article unscrambler which utilizes at least one elongated wall which is reciprocated back and forth in contact with the articles as the articles are moved in a large mass to a restricted width of articles for ensuring an orderly movement thereof. The reciprocating elongated wall is hung on the conventional rails extending over the conveyor system and is thin and flexible so as to reciprocate around corners. During the reciprocating motion, the bending or flexing action of the wall shifts along the length of the wall as the wall is reciprocated back and forth around the corner of the rail. Such prevents dead spots from forming on the table conveyor in the corner.

In one embodiment, a pair of opposed reciprocating walls are utilized which are shifted in synchronism in opposite direction so as to rotate the articles wedged therebetween in opposite directions to prevent jamming of the articles therebetween.

8 Claims, 7 Drawing Figures

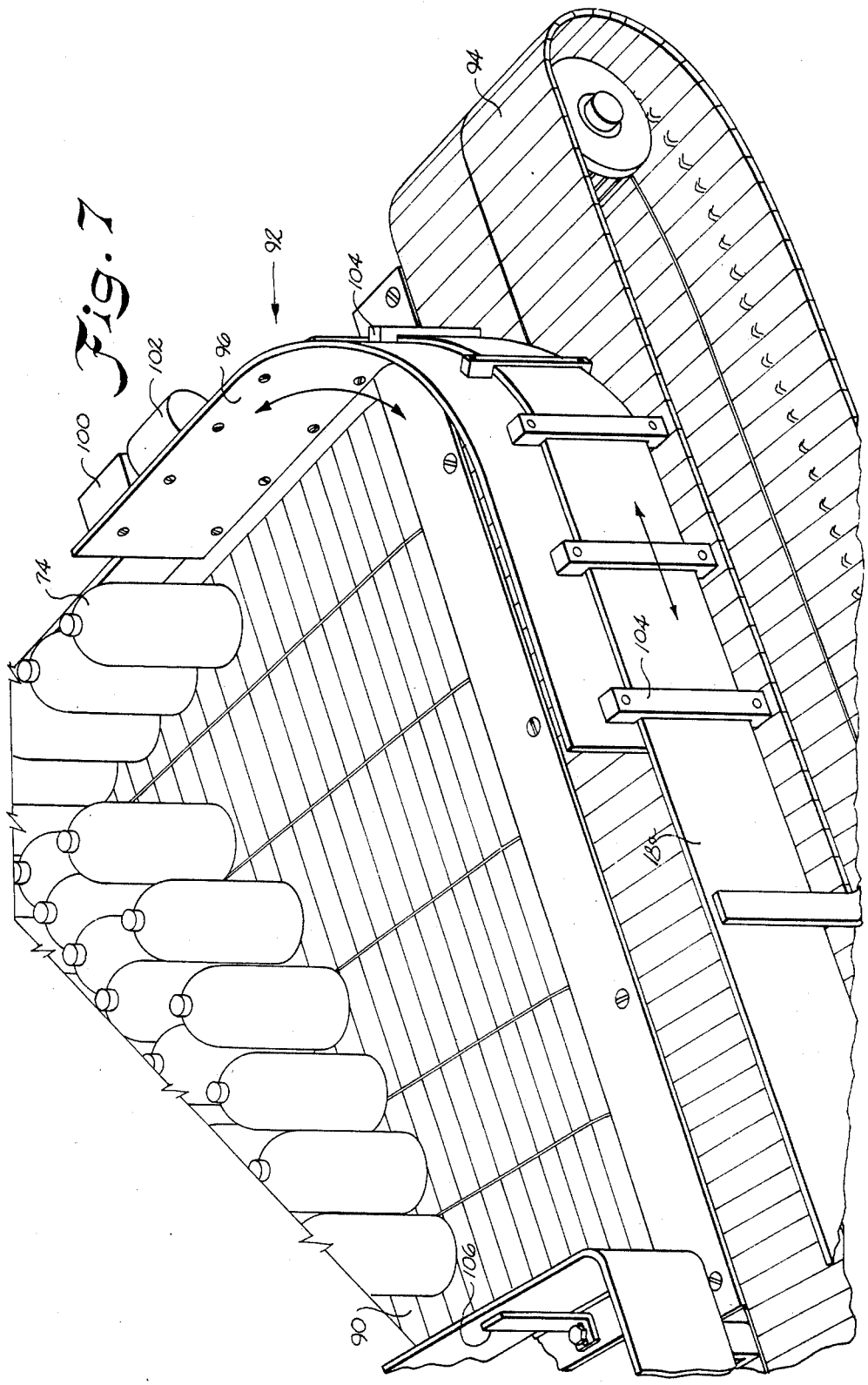

ARTICLE UNSCRAMBLER

BACKGROUND OF THE INVENTION

One of the problems encountered when transporting a mass of articles such as bottles and the like is that it is necessary to feed the articles onto a conveyor so that they can be fed in a single row to a particular operating station such as a filling machine. In many instances, instead of feeding the bottles in a single row, it is desirable to feed them in more than one row such as is the situation when they are being fed to a case packer.

Normally, empty containers are removed from pallets and placed on an enlarged moving receiving table. These empty containers are then transported on the table to a receiving conveyor which has a much narrower path. As the articles are moved from the large mass, they proceed through a constriction which, in some instances, is a pair of converging side rails and in another situation, includes an curved corner spaced from a rail which turns at a right angle.

Oftentimes, as the bottles or articles are being moved from the wide mass of articles to the narrow flow of articles, they will become jammed between the opposing side walls preventing the flow onto the narrow conveyor.

In order to prevent such from happening, conveyor jogging mechanisms have been produced. One such jogging mechanism is disclosed in U.S. Pat. No. 3,707,216 which includes a reciprocating wall that is reciprocated back and forth in the direction of flow of the articles as the articles are being fed through the restriction and is also moved in a direction transverse to the back and forth motion. These two motions imparted to the articles as they flow through the converging walls as alleged in the above patent prevent the jamming of the bottles.

In U.S. Pat. No. 3,862,680, there is disclosed an article alignment apparatus wherein the mass of articles are fed between a pair of movable walls which are made up of a plurality of rotating wheels such as skate wheels. As the articles are moved between the walls, one wall is moved forward while the opposed wall is moved in the reverse direction. This particular device is hung over the conventional table upon which articles are moved.

Still another article handling device is disclosed in U.S. Pat. No. 4,236,625. In this particular device, a wall of freely rotatable rollers is moved back and forth in the direction of flow of the articles as well as shifted transverse to the direction of articles so as to prevent jamming of the articles between the wall of freely rotatable rollers and the fixed opposed walls.

Other types of feeding devices are disclosed in U.S. Pat. Nos. 2,315,880, 2,373,600, and 3,117,665.

SUMMARY OF THE INVENTION

The apparatus in accordance with the present invention prevents the jamming of articles between opposed converging side rails as they are moved as a comingled mass of articles into a narrow passage. In one particular embodiment, the articles are moved on a conveyor between a first and second elongated wall which are converging. These walls, which include an elongated smooth flexible planar surface are hung on rails by means of brackets. They are hung so that they can be reciprocated back and forth along the rails. As the articles pass between the converging walls on a conveyor, the articles adjacent the opposed first and second elongated walls are alternately rotated in opposite directions as they are moved forward so as to prevent jamming thereof. The walls are rotated back and forth by means of a pair of pneumatically-operated cylinders.

In another embodiment, the mass of articles are moved on a large conveyor and then shift directions at a right angle onto a narrow conveyor. In order to prevent a dead spot forming at the corner of the large conveyor and the narrow conveyor, an elongated wall is slidably hung on corner of the outer rail and is reciprocated back and forth. As the wall is reciprocated back and forth, the articles engaging the planar wall are alternately rotated so as to prevent jamming of the articles as they enter the narrow width passage over the second conveyor.

Accordingly, it is an important object of the present invention to provide a simple and efficient device for preventing the jamming of articles between retaining walls carried on a conveyor as they move from a large mass into a narrow group of articles.

Still another important object of the present invention is to provide an apparatus which will assist in changing the direction of flow of articles moving on a table top conveyor to a right angle positioned narrow conveyor without said articles jamming between the opposed walls.

Still another important object of the present invention is to provide a lightweight flexible wall which reciprocates back and forth to assist the movement of articles around corners and through converging passages into a smaller width passage.

The construction designed to carry out the invention will be hereinafter described, together with other features thereof.

The invention will be more readily understood from a reading of the following specification and by reference to the accompanying drawings forming a part thereof, wherein an example of the invention is shown and wherein:

BRIEF DESCRIPTION OF THE DRAWINGS

FIG. 7 is a perspective view illustrating the apparatus of FIG. 6.

DESCRIPTION OF A PREFERRED EMBODIMENT

Figure 1:
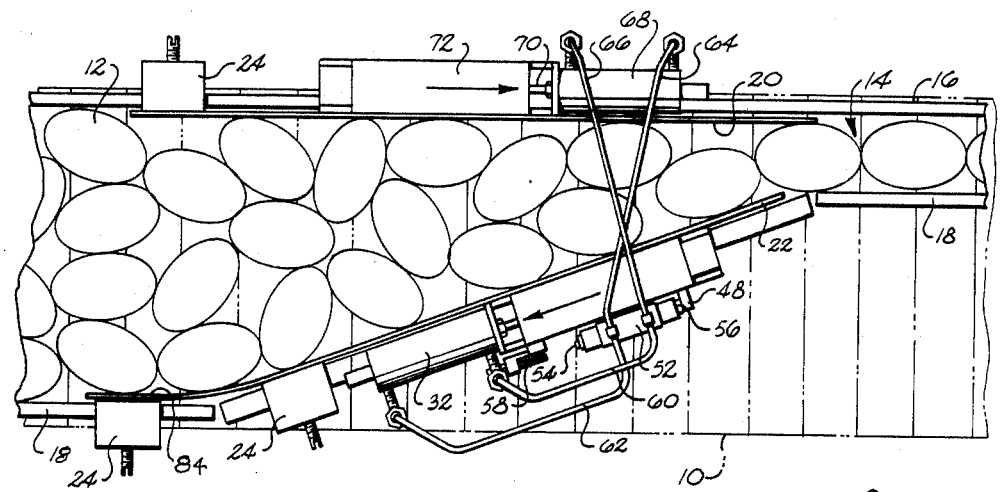
FIG. 1 is a plan view of the device of FIG. 5 transporting different shaped bottles.

Referring in more detail to FIG. 1 of the drawings, there is illustrated an elongated conveyor generally designated by the reference character 10 and indicated in broken lines which is used for transporting a mass of articles 12 from a co-mingled mass into a narrow passage generally designated by the reference character 14. The passage 14 is defined by a pair of side rails 16 and 18. These side rails extend along the entire length of the conveyor and converge towards each other to define the reduced width passage 14.

Figure 2:
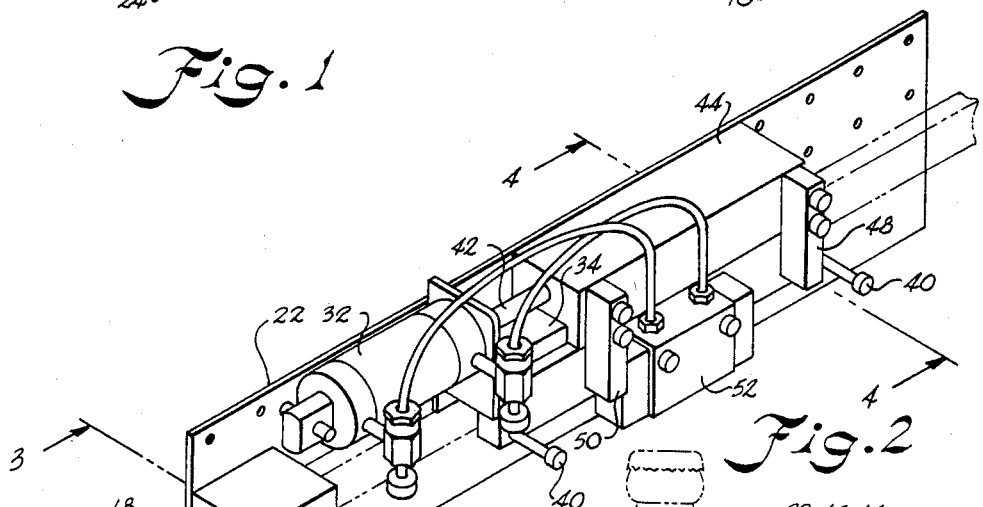
FIG. 2 is an enlarged perspective view illustrating one movable wall of the device of FIG. 1.
Figure 3:
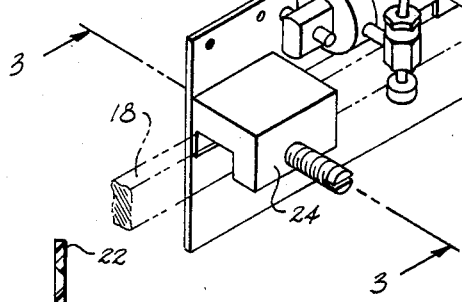
FIG. 3 is a sectional view taken along line 3—3 of FIG. 2.
Figure 4:
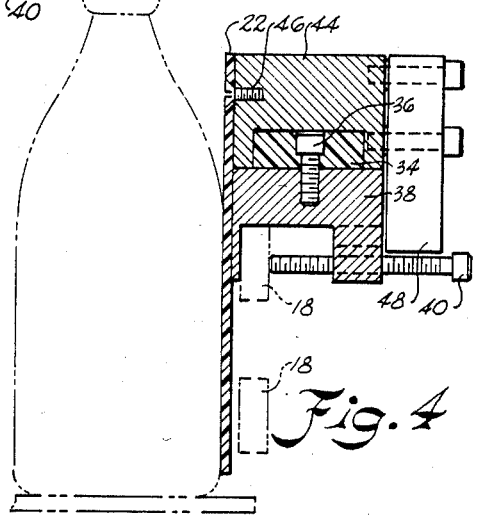
FIG. 4 is a sectional view taken along line 4—4 of FIG. 2.

The side rails as shown in FIGS. 2, 3 and 4 consist of a pair of vertically spaced bar members 18 which are rigidly fixed above the conveyor by suitable bracing, not shown. Such side rails are conventional rail systems.

One problem when attempting to move the mass of articles 12 from the large mass as shown in FIG. 1 on the left to the single row of articles through the passage 14 as shown on the right, is that they will tend to become jammed between the converging walls. When they become jammed, they prevent the flow of articles into the restricted passage 14.

In order to prevent the articles from becoming jammed, a first elongated wall 20 is carried on one of the opposed rails 16 and a second elongated wall 22 is movably carried on a portion of the other opposed converging side rail 18.

The elongated walls 20 and 22, in one embodiment, are constructed of high molecular weight polyethylene or any suitable material which produces a self-lubricating effect for minimizing scratching of the bottles that come in contact therewith. The walls are approximately 3/16" thick so that they can be readily bent and are flexible to conform to the path of the rail that it is to be mounted on. Brackets 24, which are bolted by means of screws 26 to the rear side of the plates 20 and 22, are provided for reciprocably securing the walls 20 and 22 to the rails 16 and 18. These brackets have a plastic adjustable screw 28 extending through a flange thereof that bears against the face of the rails 16 and 18.

It is to be understood, of course, that the pressure imparted by the screw 28 is only sufficient enough to hold the bracket in place relative to the rail 18 while permitting movement therebetween.

The side rail 22 is reciprocably moved back and forth by means of a pneumatically-operated cylinder 32 that is supported on a block 34 that is, in turn, fixed to the rail 18 through a bolt 36, a bracket 38, and an adjustable bolt 40 as shown in FIG. 4.

Extending out of the end of the pneumatic cylinder 32 is a piston rod 42 that has a block 44 fixed to the end thereof. The block 44, as shown in FIGS. 2 and 4, is connected to the side wall 22 by means of screws 46. As a result, the block 44 moves with the side wall and the pneumatic cylinder 22 remains stationary. Extending out from the block 44 is a pair of spaced brackets 48 and 50 which are used for activating a fixed pneumatic switch 52. The pneumatic switch 52 has plungers 54 and 56 carried on opposed ends thereof as shown in FIG. 1 so that when the block 44 moves to the right as shown in FIGS. 1 and 2, the plunger strikes the abutment 48 reversing the flow of air through the pneumatic switch 52 to send the air to the other port of the pneumatic cylinder 32. This, in turn, causes the block 44 to be shifted back to the left along with the elongated wall 22. It is shifted back to the left until the plunger 54 strikes the abutment 50 terminating the length of its stroke. It is to be understood, of course, that the length of the stroke of the piston can be varied by varying the position of the abutments 48 and 50 or by using an adjustable screw 58 mounted on one or the other abutments for striking the plungers 54 and 56. Tubes 60 and 62 couple the pneumatic switch to the cylinder as shown in FIG. 2. For purposes of clarity, the tubes of FIG. 2 are only shown coupled to cylinder 32, however, in the preferred embodiment, they are also coupled to cylinder 68 as shown in FIG. 1. In order to synchronize the movement of the first and second elongated walls 20 and 22, output tubes 64 and 66 are connected between the pneumatic switch 52 and a pneumatic cylinder 68 associated with the wall 20. As a result, since the tubes 64 and 66 are criss-crossed relative to the tubes 60 and 62, the piston of cylinder 68 is shifted in exactly the opposite direction from the piston associated with the cylinder 32.

The pneumatic cylinder 68 has a piston rod 70 connected to a block 72 that is, in turn, fixed to the elongated wall 20 for moving the wall back and forth during the unscrambling operation.

The pressurized source of air is not shown and it is to be understood that it is coupled to the bottom of the pneumatic switch 52. This coupling is also not shown and can be coupled in any suitable conventional way.

Figure 5:
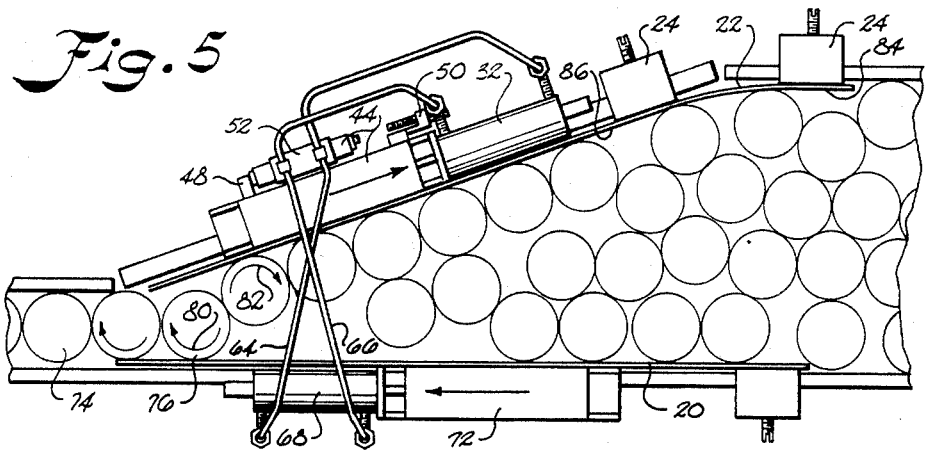
FIG. 5 is a plan view of a conveyor system transporting a plurality of articles.

As can be seen, the bottles 74 being shifted on the conveyor table of FIG. 5 which is not shown are rotated in opposite direction by the elongated walls 22 and 20, responsive to the action of the pneumatic cylinders 32 and 68. The direction of rotation of the bottles are shown by the arrows 80 and 82, respectively.

As a result of the bottles that are touching the opposed walls being rotated in the opposite direction, binding therebetween is prevented providing an even and smooth flow from the co-mingled mass to the single row.

The elongated wall 22 such as shown in FIGS. 1 and 5 includes a lead-in portion 84 and a main body portion 86 which are joined at an obtuse angle. This angle in the flexible wall 22 ensures smooth flowing of the bottles on the conveyor and down to the single row.

In operation, as the conveyor 10 moves the co-mingled mass of bottles towards the reduced width passage 14, the thin planar flexible walls 20 and 22 are reciprocated back and forth by means of the pneumatic cylinders 32 and 68. This, in turn, causes the bottles engaging the particular walls to be rotated in opposite directions preventing binding therebetween. Also, as a result of the lightweight of the planar walls 20 and 22, they can be readily hung on the conventional rails 18 associated with article handling conveyors by means of the brackets 24. They are also, as a result of being constructed of thin flexible material such as high-molecular weight polyethylene, able to bend to provide a junction between the infeed portion 84 and the main body portion 86 in the wall 22. This bending or flexing action varies as the wall 22 is reciprocated back and forth producing a infeed of the bottles.

Figure 6:
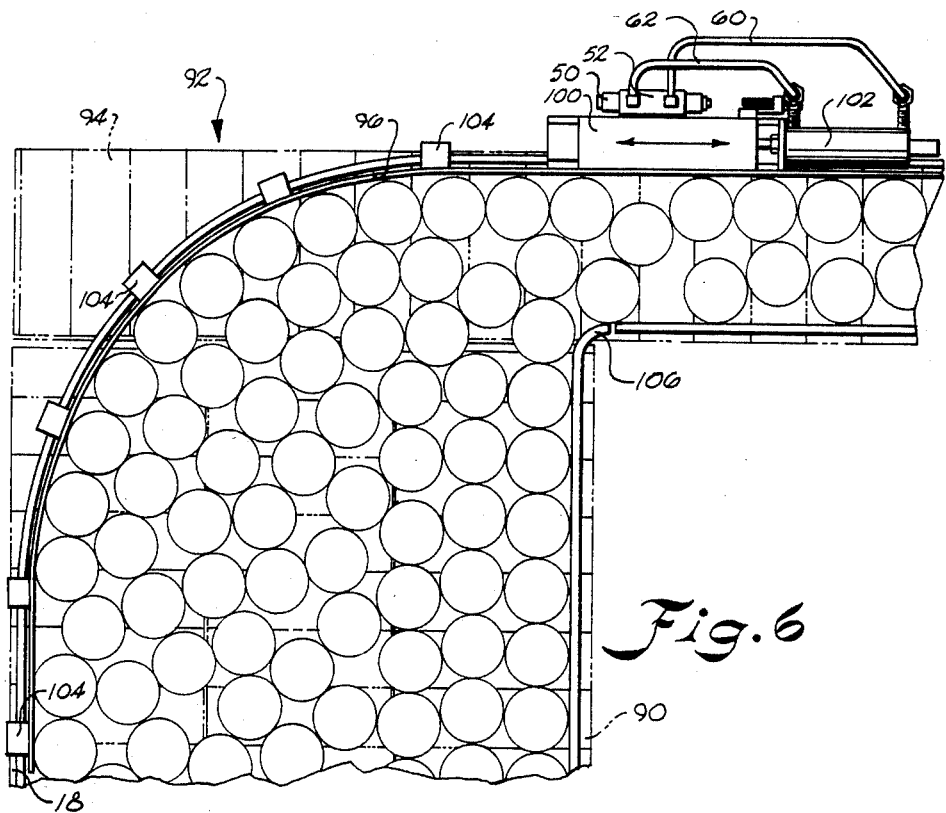
FIG. 6 is a plan view of a modified form of the invention illustrating the manner in which articles are moved on a conveyor around a corner.

In FIGS. 6 and 7, a large mass of bottles are fed inwardly on a conventional table conveyor 90 to a corner generally designated by the reference character 92 extending over a smaller conveyor 94. It is desired to shift the direction of flow of the bottles 90 degrees as the bottles move from the large table conveyor 90 to the smaller end conveyor 94 which is moving to the right as shown in FIGS. 6 and 7.

In order to prevent a dead spot from occurring on the conveyor table, an elongated flexible wall 96 is hung by means of brackets 104 similar to the brackets 24 on the rails 18 associated with the conveyor table. Connected to the wall 96 is a block 100 which operates identical to the block 44 shown in FIG. 2. The block 100, in turn, is connected to a pneumatic cylinder, the operation of which is identical to that previously described in connection with the device of FIG. 2. Accordingly, like reference characters will be used hereinafter for the common features of the embodiments.

The side rail 18a of the embodiment shown in FIG. 7 has a greater height than the side rail 18 of the device as shown in FIGS. 1, 2 and 3. As a result, a different type of bracket is used for securing the flexible elongated wall 96 thereto. In this particular embodiment, a bracket 104 includes a U-shaped member that has inwardly turned flanges for receiving bolts for securing such to the flexible wall 96. As a result, the brackets 104 slide along the rail 18a with the movable wall 96. A conventional guide rail 106 is carried opposite the movable wall 96 for restraining or restricting the path of the bottles.

As the mass of articles are moved forward on the table conveyor 90, they come in contact with the reciprocating wall 96. Since the reciprocating wall 96 extends around the corner, no dead spots are encountered and the articles move in an orderly manner on the smaller conveyor 94 between the restricted walls.

Since the flexible wall 96 moves around the curve in the rail 18a as it reciprocates back and forth, it tends to carry the bottles 74 with it around the corner during the transfer from the table conveyor 90 to the small conveyor 94.

While a preferred embodiment of the invention has been described using specific terms, such description is for illustratives purposes only, and it is to be understood that changes and variations may be made without departing from the spirit or scope of the following claims.

What is claimed is:

1. An apparatus for preventing the jamming of articles between opposed converging side rails as they are moved as a comingled mass of articles into a lesser number of rows of moving articles comprising:
   a first elongated wall movably carried on one of said opposed converging side rails;
   a second elongated wall movably carried on the other of said opposed converging side rails;
   brackets having a portion connected to an elongated wall and an outwardly extending connecting member for movably supporting said elongated wall on a respective side rail;
   means for reciprocally moving said first elongated wall back and forth on said side rail;
   means for reciprocally moving said second elongated wall back and forth on said other side rail with the movement of said second elongated wall being in the opposite direction of the movement with said first wall so that when said second wall is moving in the direction of flow of said articles, said first wall is moving in the opposite direction;
   said first and second elongated walls including a smooth planar vertically extending surface constructed of plastic material which engages the sides of articles adjacent thereto for rotating said articles engaging said opposed walls in opposite directions for preventing jamming of the articles therebetween; and
   at least one of said first and second elongated walls providing upon reciprocal movement a flexing action to accomodate movement of said wall through an angled junction of said side rail for preventing areas of stagnation in the comingled mass of articles.

2. The apparatus as set forth in claim 1 further comprising:
   said means for reciprocating said first and second elongated walls back and forth on said side rails including a pair of pneumatically operated cylinders.

3. The apparatus as set forth in claim 1 further comprising:
   said first elongated wall including,
   (i) a lead-in portion,
   (ii) a main body portion,
   (iii) said lead-in portion positioned relative to said main body portion at an obtuse angle.

4. The apparatus as set forth in claim 3 wherein said first elongated wall being an elongated flexible wall of sheet material.

5. An apparatus for preventing jamming of articles and for changing the direction of flow of said articles on a conveyor system as said articles are being transformed from a large mass of articles on a conveyor traveling in one direction into orderly rows of articles on another conveyor traveling in another direction, guide rails carried on opposed sides of said conveyor system restricting the lateral movement of said articles, and at least one of said guide rails changing direction along its length in order to extend around a corner comprising:
   an elongated flexible wall of sheet material,
   brackets supporting said flexible wall on one of said guide rails with said flexible wall of sheet material following the run of said one rail as said rail changes direction along its length;
   said brackets providing a sliding connection between said rail and said flexible wall of sheet material;
   a power-operated means connected to said elongated flexible wall of sheet material for reciprocally moving said elongated flexible wall of sheet material back and forth along said one of said guide rails whereby said planar wall engages said articles and transferring said articles from said one conveyor to said another conveyor in an orderly manner.

6. The apparatus as set forth in claim 5 further comprising:
   said brackets being spaced along said rail for hanging said elongated flexible wall on said one rail.

7. The apparatus as set forth in claim 5 further comprising:
   said one of said guide rails when changing direction making a 90 degree arc around said corner.

8. An apparatus for preventing jamming of articles and for changing the configuration of articles on a conveyor system as said articles are being transformed from a large mass of articles into narrow orderly rows, including two guide rail means carried on opposed sides of said conveyor system for restricting the lateral movement of said articles, at least one of said guide rail means changing direction in order to narrow said mass of articles, comprising:
   an elongated flexible wall of sheet material;
   brackets supporting said flexible wall on said one of said guide rail means, said flexible wall following the run of said one of said guide rail means as said one of said guide rail means changes direction from being substantially parallel to said conveyor system to being inwardly angled with respect to the travel of said conveyor system;
   said brackets providing a sliding connection between said one of said guide rail means and said flexible wall of sheet material;
   and means for reciprocally moving said elongated flexible wall of sheet material back and forth along said one of said guide rail means whereby said flexible wall engages and narrows said articles as said articles are orderly transformed from a large mass into narrow rows.

* * * * *